May 23, 1944.  A. A. YOUNG  2,349,645
METER MOUNTING
Filed July 27, 1940  3 Sheets-Sheet 1
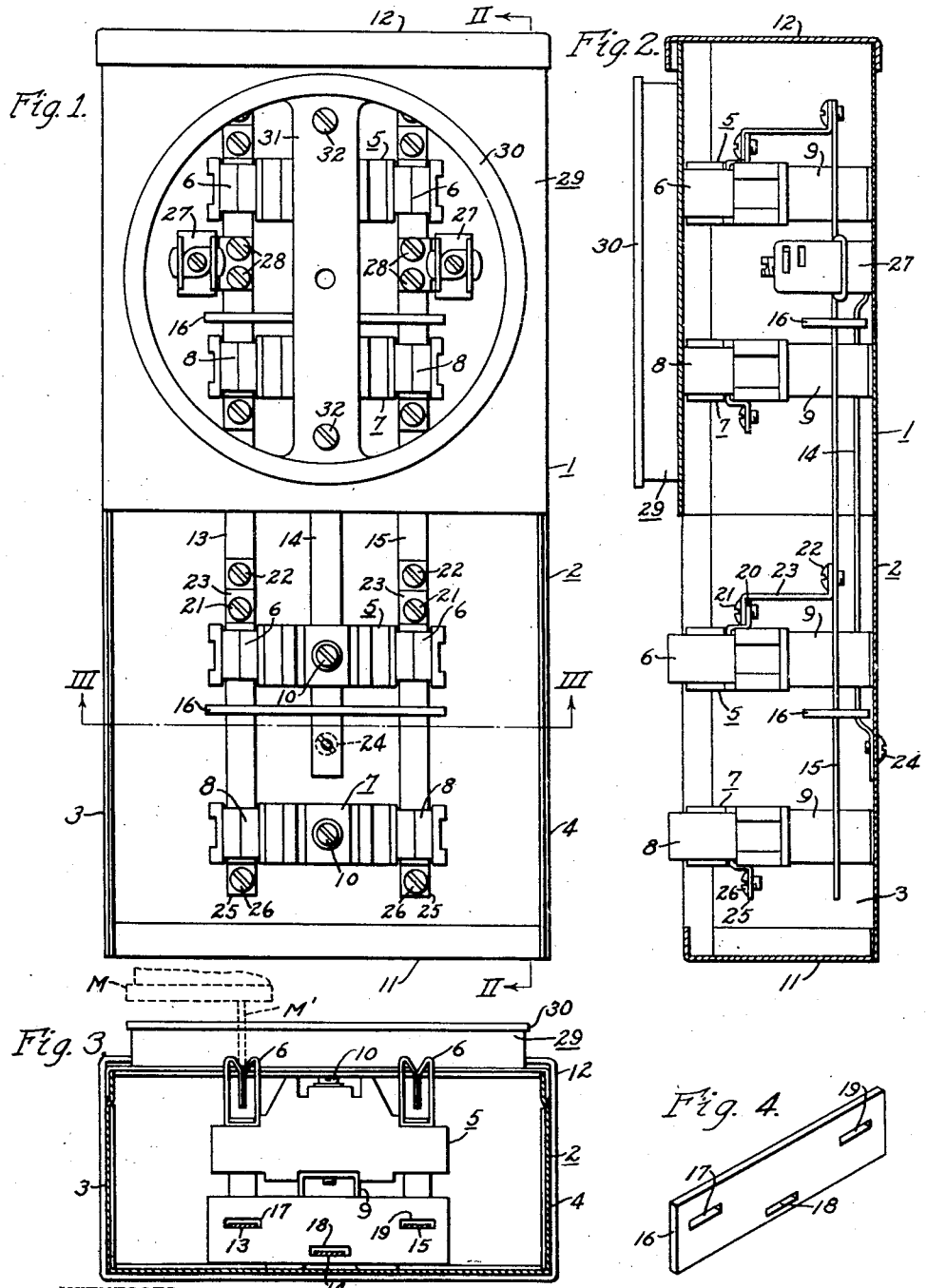
WITNESSES:
Leon M. Garman
C. L. Freedman
INVENTOR
Arthur A. Young.
BY
ATTORNEY

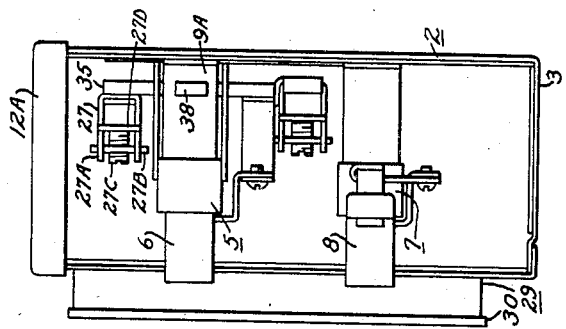
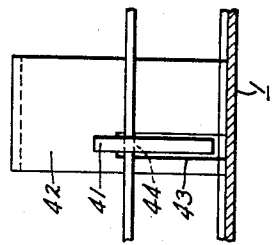
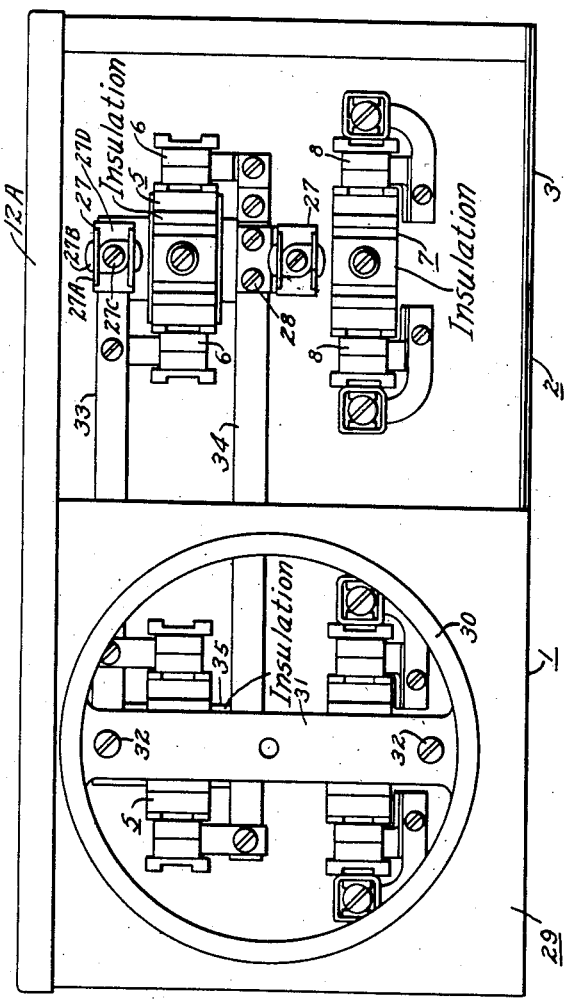
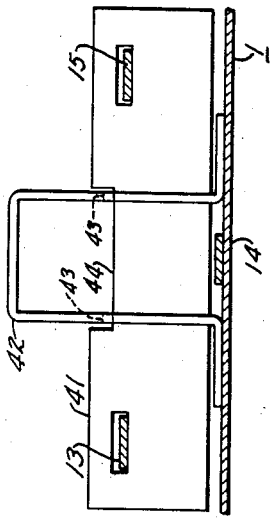
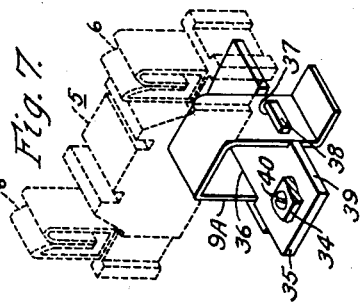

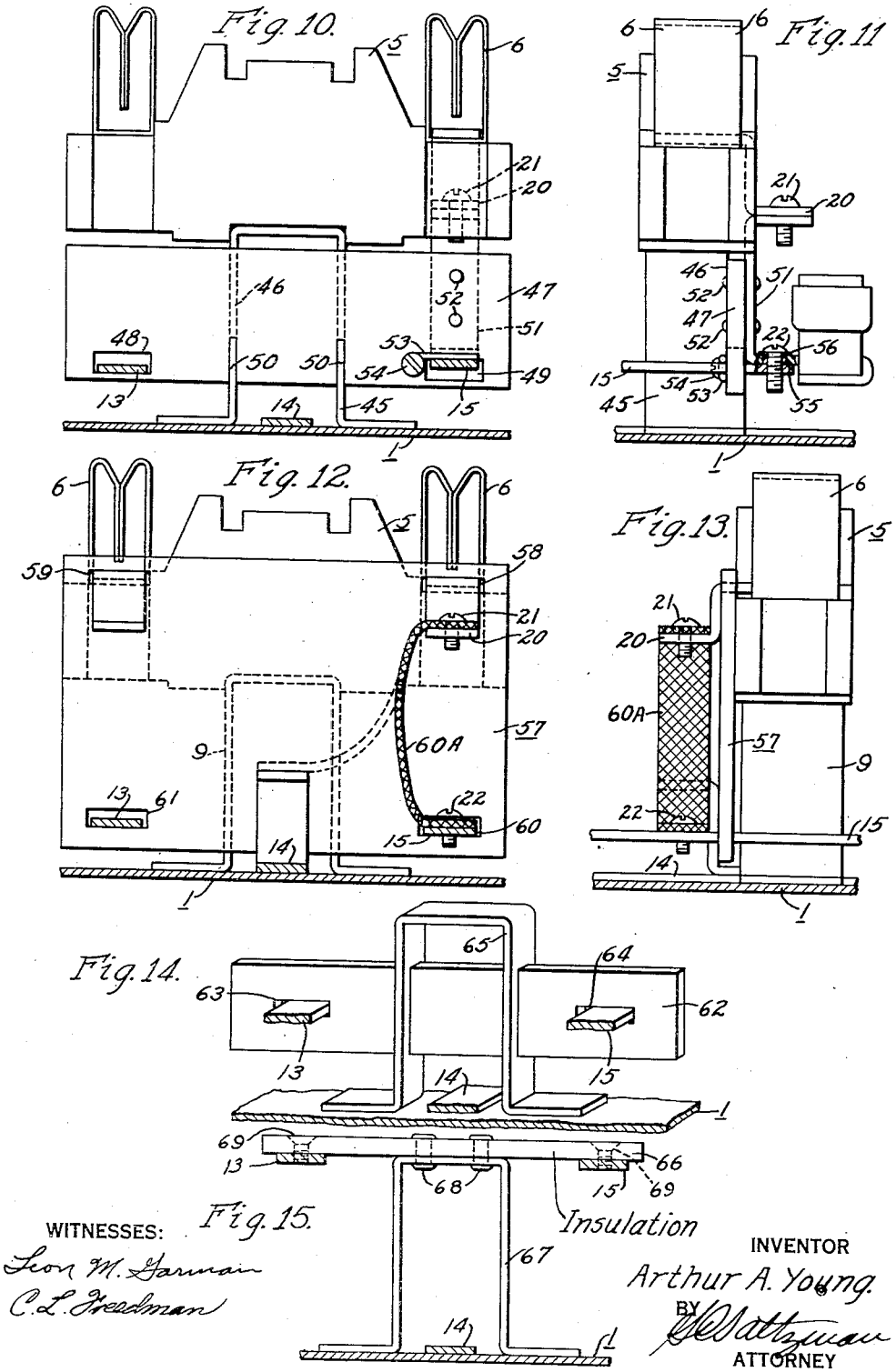

Patented May 23, 1944

2,349,645

UNITED STATES PATENT OFFICE 2,349,645

METER MOUNTING

Arthur A. Young, Manchester, N. H., assignor to Anchor Manufacturing Company, Boston, Mass., a corporation of Massachusetts Application July 27, 1940, Serial No. 347,919

5 Claims. (Cl. 175—226)

This invention relates to mountings for electrical instruments and it has particular relation to trough mountings for detachable watthour meters.

When a number of electrical instruments such as watthour meters are to be located at a single point, it is convenient to mount the watthour meters on a panel made up in the form of a trough. This trough may be constructed from a plurality of U-shaped trough receptacles which are aligned to provide a continuous wireway. Each of the trough receptacles is provided with contact jaws for receiving the contact terminals or blades of a detachable watthour meter.

Since the watthour meters are generally supplied from a single source of energy, it is convenient to provide line conductors or buses extending along the full length of the wireway in the trough. Connections are then made between the conductors or buses and appropriate contact jaws in each of the trough receptacles.

Certain variations in the connections of watthour meters mounted on a single trough make it desirable to provide a flexible system for connecting the conductors or buses to appropriate contact jaws. For example, it is common in the art to provide three-wire, single-phase service for many electrical installations. In such installations it may be necessary to provide two-wire meters in addition to three-wire meters. Consequently, the installation must permit the connection of a meter either to the main conductors of a three-wire source or to one of the main conductors and a neutral conductor of the three-wire source.

A still further variation results from the desirability of balancing two-wire loads supplied from a three-wire source. To this end it is desirable to provide means for selectively connecting watthour meters across the neutral conductor and either of the two main conductors of a three-wire source.

For providing a measure of flexibility, it has been customary in the prior art to provide trough receptacles with subbases attached to the bottom wall thereof. The subbases are provided with clips and terminals for engaging line conductors or buses and for establishing contact with the contact jaws. An example of the subbase type of construction is shown in the Johansson Patent 2,182,629, issued December 5, 1939.

Although subbases offer a possible solution to the problem, they are objectionable from the standpoint of cost and complexity. Moreover, the subbase tends to obstruct a substantial portion of the wireway.

In accordance with this invention the line conductors or buses in a wireway formed by trough receptacles are positioned by spacers which may be formed of an insulating member provided with openings or screws for engaging the conductors or buses. These spacers are self-supporting and need not be attached to the walls of the trough receptacles. If additional support for the spacers is desired, each spacer may be mounted on or interlocked with a bracket provided in each trough receptacle for supporting the contact jaw assembly.

In accordance with a further aspect of this invention, the connections between the line conductors or buses and the contact jaws may be entirely independent of the spacers and may be spaced therefrom.

It is, therefore, an object of this invention to provide an improved mounting for electrical instruments.

It is a further object of this invention to provide independent spacers for conductors mounted in the wireway of a mounting for electrical instruments.

It is a further object of this invention to provide spacers for conductors located in the wireway of a mounting trough for watthour meters, which spacers are carried by brackets also employed for supporting contact jaw assemblies.

It is a further object of this invention to provide a mounting for electrical instruments wherein conductors positioned in the mounting are provided with separate means for spacing the conductors and for connecting the conductors to appropriate contacts therein.

It is a still further object of this invention to provide a trough for detachable watthour meters wherein conductors mounted in the trough wireway are positioned by spacers which are not mounted directly on the walls of the trough.

Other objects of the invention will be apparent from the following description taken in conjunction with the accompanying drawings, wherein:

Figure 1 is a view in front elevation with portions removed of a mounting trough for detachable instruments arranged for vertical mounting.

Fig. 2 is a view in section taken along the line II—II of Fig. 1.

Fig. 3 is a view in section taken along the line III—III of Fig. 1.

Fig. 4 is a detail view in perspective of a spacer suitable for the trough illustrated in Figs. 1 to 3.

Fig. 5 is a view in front plan with parts removed of a mounting for detachable electrical instruments which is designed for horizontal mounting.

Fig. 6 is a view in end elevation of the trough mounting illustrated in Fig. 5 with an end wall removed.

Fig. 7 is a detail view in perspective of a contact jaw assembly suitable for the trough mounting illustrated in Figs. 5 and 6.

Figs. 8 to 13 and 15 are detail views in elevation of modifications of spacer mountings embodying the invention, and Fig. 14 is a view in perspective of a modified spacer mounting embodying the invention.

Referring to the drawings, Figs. 1, 2 and 3 show a panel or trough suitable for detachable instruments such as detachable watthour meters. This trough includes a plurality of trough receptacles 1 and 2 which are U-shaped. The trough receptacles are arranged in alignment to provide a continuous trough having a continuous wireway. Each trough receptacle is provided with side walls 3 and 4 for partially enclosing a contact jaw assembly.

Although the contact jaw assemblies may vary in accordance with the type of electrical instrument to be connected thereto, in the illustration each trough receptacle is provided with a line block 5 carrying two contact jaws 6, and a load block 7 carrying two contact jaws 8. Each of the blocks 5 and 7 is formed of insulating material and is mounted in its trough receptacle in any suitable manner as by a U-shaped bracket 9 having its legs attached to a wall of the trough receptacle in any desired way as by resistance welding. Suitable means may be provided for attaching each of the blocks to its bracket, such as a machine screw 10 which passes through the block into a threaded opening in the U-shaped bracket 9.

The enclosure for the trough is completed by an end wall 11 and an end wall 12. Since the trough is designed for vertical mounting, the end wall 12 is formed as a weather cap to protect the interior of the trough when the trough is placed outdoors. The construction of Figs. 1 to 3, which has thus far been described, is well known in the art.

Since the line blocks 5 have their contact jaws generally connected to a common source, it is convenient to provide common conductors or buses 13, 14 and 15 in the wireway provided by the trough for energizing these contact jaws. The number and arrangement of the buses 13, 14 and 15 will vary in accordance with the particular service for which the trough is designed, but in the specific illustration the conductor 14 represents a neutral control and the conductors 13 and 15 represent main conductors for three-wire service. Furthermore, the shape of the conductors may vary and they may be provided with insulation if desired. For the purpose of illustration, however, the conductors 13, 14 and 15 are represented as buses which may be formed of copper strap.

In order to provide proper spacing for the buses 13, 14 and 15, one or more insulating spacers 16 are provided. The insulating spacer may take the form illustrated in Fig. 4 wherein the spacer comprises a strip of insulating material such as a phenol formaldehyde resin or any other suitable insulating material.

The insulating spacer 16 is provided with three openings 17, 18 and 19 extending therethrough for reception of the buses 13, 14 and 15. These openings may be proportioned to receive snugly the buses or they may be larger to permit movement of the buses relative to the spacer. A special utility of a spacer provided with a slot permitting movement of a bus is set forth below.

Referring to Figs. 1 to 3, it will be noted that the spacers 16 are completely free of the walls of the trough. They merely serve to prevent movement of the buses relative to each other. Consequently, when any one of the buses is fixed relative to the trough, movement of the remaining buses is prevented. The permanent location of the buses greatly facilitates the connections of the contact jaws thereto. When connecting the buses to a large number of meters, it is desirable, as above indicated, to balance loads when two-wire meters are to be energized from three-wire service. If the buses are permanently located by the spacers 16, connections may be made to any of the buses without encountering any tendency of the bus to float away from its desired position.

The connections from the contact jaws 6 to the buses may be effected in numerous ways. As illustrated, each of the contact jaws 6 is provided with a projecting lug 20 having a terminal screw 21 associated therewith. In addition, certain of the buses are provided adjacent the contact jaws 6 with terminal screws 22. In order to connect a contact jaw 6 to a bus, it is merely necessary to provide a Z-shaped connecting link 23 having openings for receiving the terminal screws 21 and 22. When the terminal screws 21 and 22 are advanced to clamp the link 23 to the lug 20 and the bus, a positive contact between the contact jaw in the bus is assured.

It should be noted that the connecting link 23 is independent of the spacer 16 and may be separated therefrom if desired. This means that the only function of the spacer 16 is to preserve satisfactory locations of the buses.

Since the neutral conductor 14 generally is grounded, it may be connected to the bottom wall of one or more trough receptacles in any suitable manner, as by a machine screw 24 in accordance with standard practice.

It will be noted that the contact jaws 8 also are provided with lugs 25 and terminal screws 26. Since the contact jaws 8 in each trough receptacle generally supply a separate load, the load conductors for each trough receptacle may be attached to the contact jaws through the lugs and terminal screws 25 and 26.

In order to connect service wires to the buses 13, 14 and 15, the buses may be provided with suitable terminals 27 which may be attached to the buses in any suitable manner as by machine screws 28. From an inspection of Figs. 1 and 2 it will be noted that the terminals 27 are spaced from the spacer 16 and do not interfere with the design of the spacer 16 for a single function.

It will be understood that each trough receptacle is provided with a cover plate 29 which carries a ring flange 30 proportioned to engage the flange of a detachable instrument such as a watthour meter. The cover plate 29 may include a cross bar 31 and may be attached to a trough receptacle by machine screws 32 which engage lugs (not shown) carried by the trough receptacle.

In Fig. 3, a detachable instrument such as a watthour meter M, having contact terminals or blades M', is represented in broken lines slightly spaced from the ring 30. This detachable watthour meter may, for example, be of the type disclosed in the Bradshaw et al. Patent 1,969,499, issued August 7, 1934.

It is believed that the assembly of the trough illustrated in Figs. 1, 2 and 3 is apparent from the foregoing description. With the trough receptacles in alignment the buses 13, 14 and 15 may be threaded through the insulating spacer 16 and the terminals 27 then may be attached thereto. After the buses are installed, the blocks 5 and 7, together with their contact jaws, may be attached to their respective brackets 9. The links 23 may be next connected between the appropriate buses and the lugs 20. After the load conductors are attached to the lugs 25 and the service conductors to the terminals 27, the cover plates 29 may be placed in position and attached by means of the screws 32.

In Figs. 5 and 6, a trough is illustrated which is designed for horizontal mounting. This trough includes trough receptacles 1 and 2 which are similar to those shown in Figs. 1 to 3, and which have similar reference characters. However, since the trough of Figs. 5 and 6 is designed for horizontal mounting, a weather cap 12A is provided for the side wall which will be positioned at the top of the trough.

Although various combinations of buses may be employed for horizontal mounting, for purpose of illustration the trough of Figs. 5 and 6 is designed for two-wire service. To this end two buses 33 and 34 are provided for supplying energy from service conductors to the contact jaws 6 carried by the line blocks 5. Since the trough of Figs. 5 and 6 is designed for horizontal mounting, the line and load blocks 5 and 7 are now positioned parallel to the buses 33 and 34. With this arrangement of the blocks, a bus spacer 35 similar to that shown in detail in Fig. 7 has been found suitable. The blocks 5 in Figs. 5, 6 and 7 are mounted on a bracket 9A which corresponds to the bracket 9 of Figs. 1 to 3. It will be noted, however, that the bracket 9A is provided with two opposed slots 36 and 37 for the reception of tongues 38 extending from the spacer 35, the spacer 35 conveniently being formed from a single strip of insulating material similar to that employed for the spacer 16. The spacer 35 may be provided with ribs 39 for engaging the edges of the bracket 9A.

Any suitable connecting means may be provided for attaching the buses 33 and 34 to the spacers 35. Although the buses may be passed through slots provided in the spacer 35 similar to the slots in the spacer 16, for the purpose of illustration the buses 33 and 34 are attached to the spacers 35 by means of machine screws 40.

The terminals 27 for reception of service conductors may be attached to the buses 33 and 34 by the machine screws 28 in the manner described with reference to Figs. 1, 2 and 3.

Although the construction of the terminals 27 may vary, a typical construction is illustrated in Fig. 6. Referring to Fig. 6, the terminal 27 includes a U-shaped member 27A having a bridging member 27B attached thereto. A machine screw 27C passes through a threaded opening in the bridging member and carries at its lower end a plate 27D. The screw 27C is rotatable relative to the plate 27D and when operated tends to force the plate towards the base of the U-shaped member 27A for clamping therebetween a service conductor.

It will be noted from an inspection of Figs. 5 to 7 that the spacers 35 are carried by the same bracket which supports the line blocks 5. Moreover, it will be observed that the spacers 35, if desired, may be spaced from the bottom wall of the trough in order to leave adequate space for wiring operations.

In the front and side elevations of Figs. 8 and 9, a modified spacer is illustrated which is retained by a bracket employed in a trough. In this construction a spacer 41 is provided with openings extending therethrough for the reception of the buses 13 and 15. Although the spacer 41 could be provided with an opening for reception of the neutral conductor 14, for the purpose of illustration the neutral conductor or bus 14 is shown adjacent the bottom wall of the trough 1. In Figs. 8 and 9 a bracket 42 is illustrated which corresponds to the bracket 9 of Figs. 1, 2 and 3. However, this bracket 42 is provided with slots 43 for reception of the spacer 41. In addition, the spacer 41 is provided with a slot 44 which permits lips on the spacer to engage the side walls of the bracket 42. When the bracket 42 is attached to the trough 1, the spacer 41 interlocks therewith to maintain a predetermined position. The bracket 42 and the spacer 41 may be employed in place of the bracket 9 and spacer 16 of Figs. 1, 2 and 3.

Figs. 10 and 11 show, respectively, front and side elevation views of a modified spacer assembly. In these figures the line block 5 is mounted on a bracket 45 which is provided with a recess 46 at its upper end for reception of a spacer 47. This spacer is provided with openings 48 and 49 for the reception of the conductors 13 and 15. The neutral conductor 14 again passes beneath the spacer. It will be noted that the spacer 47 projects below the notch 46 and is provided with slots 50 for the reception of projecting portions of the bracket 45. With this construction the spacer 47 is adequately positioned by the bracket 45.

In order to connect the contact jaws 6 to the buses 13 and 15, each lug 20 of the contact jaw 6 may be provided with a link 51 extending between the lug and the bus 15. As indicated above, the terminal screws 21 and 22 are provided for firmly attaching the link 51 to the lug 20 and the bus 15.

If desired, the link 51 may be attached to the spacer 47 in any suitable manner as by rivets 52.

The construction thus far described readily permits of the introduction of a disconnect operated by any of the screws 21 or 22. This is illustrated, for example, in Fig. 10, wherein the bus 15 passes through an enlarged slot 49. The bus 15, by its own resiliency or with the assistance of a biasing spring 53 attached to the spacer 47 in any suitable manner, as by a screw 54, is urged towards the bottom of the slot 49 away from the link 51. The screw 22 is effectively insulated from the link 51, as by passing the screw 22 through an insulating bushing 55 positioned in the link 51 and by providing an insulating washer 56 between the head of the screw 22 and the link 51.

When the screw 22 is backed off, the bus 15, because of its bias, drops away from the link 51. Since the screw 22 is insulated from the link 51, when the bus 15 drops the conductor path between the bus 15 and the link 51 is effectively interrupted. In order to restore service after a disconnecting operation, it is merely necessary to rotate the screw 22 to bring the bus 15 and the link 51 into firm contact with each other.

Figs. 12 and 13 show respectively front and side elevations of a still further modification of a spacer. In Figs. 12 and 13, a spacer 57 is provided with slots 58 and 59 for reception of the lugs 20 associated with the contact jaws 6. The spacer 57 also is provided with openings 60 and 61 for the reception of the buses 13 and 15. With this construction the angular formation of the lug 20 serves to retain the spacer 57 against the side of the line block 5.

In Fig. 12 the connection between the contact jaw 6 and the bus 16 is effected through a flexible link 60A. This facilitates the connection of the contact jaws 6 either for two-wire or three-wire operation. With the link 60A connected as illustrated in full lines in Fig. 12, the contact jaws are connected for three-wire operation. By transferring the flexible link 60A to the position indicated in dotted lines wherein it contacts the neutral bus 14, the contact jaws 6 are conditioned for two-wire operation.

In Fig. 14 a still further modification of a spacer embodying the invention is illustrated. Fig. 14 shows an insulating spacer 62 having a uniform cross-section. In accordance with the teaching of this invention the spacer 62 is provided with slots 63 and 64 for the reception of the buses 14 and 15. The spacer 62 merely passes through slots provided in a bracket 65 which corresponds to the bracket 9 of Fig. 1. With this construction a spacer 62 is held by the bracket against movement in all except one direction.

In Fig. 15 an insulating spacer 66 is attached to a bracket 67 which corresponds to the bracket 9 of Fig. 1. This connection may be in any suitable manner as by means of rivets 68. It will be understood that the spacer 66 is interposed between the line block 5 (not shown in Fig. 15) and the bracket 67. The buses 13 and 15 may be attached to the spacer 66 in any suitable manner as herein disclosed. As shown in Fig. 15, these buses are attached to the spacer 66 by means of machine screws 69.

Although I have described the invention with reference to certain specific embodiments thereof, the invention is susceptible of numerous modifications. Therefore, the invention is to be restricted only by the appended claims when interpreted in view of the prior art.

I claim as my invention:

1. In an assembly for detachably receiving an electrical instrument having terminal contact means; a receptacle; contact element means in said receptacle for detachably engaging said terminal contact means when said instrument is positioned on said receptacle; means for supporting said contact element means in said receptacle including a bracket attached to said receptacle, a first insulating structure supported by said bracket, and means for securing said contact element means to said first insulating structure; a plurality of conductors for establishing electrical connections for said contact element means; and means retained by said bracket for holding said conductors in a predetermined relationship including an insulating member, said insulating member and said bracket having male and female portions in interlocking engagement, and said insulating member having portions projecting from said bracket for engaging said conductors.

2. In an assembly for detachably receiving an electrical instrument having terminal contact means; a receptacle; contact element means in said receptacle for detachably engaging said terminal contact means when said instrument is positioned on said receptacle; means for supporting said contact element means in said receptacle including a bracket attached to said receptacle, a first insulating structure supported by said bracket, and means for securing said contact element means to said first insulating structure; a plurality of conductors for establishing electrical connections for said contact element means; and spacing means for said conductors comprising a second insulating structure having openings extending therethrough, said conductors passing through said openings; said bracket and said second insulating structure having male and female interfitting portions for positioning said second insulating structure relative to said bracket.

3. In a panel assembly for detachably receiving detachable electrical meters having contact blades projecting therefrom, a plurality of trough receptacles arranged in alignment for providing a continuous wireway, each of said receptacles containing contact jaws for detachably receiving the contact blades of a detachable meter and means for supporting said contact jaws, a plurality of conductors extending along the wireway formed by said trough receptacles, means for electrically connecting said conductors to said contact jaws in each of said trough receptacles, and spacing means for said conductors comprising a plurality of completely self-supporting insulating structures disposed in the wireway formed by said trough receptacles free of the walls of the wireway, each of said insulating structures having openings substantially spaced from the peripheries thereof through which said conductors pass, said openings being proportioned to permit sliding movement of said conductors through the openings of the insulating structures, the wireway formed by said trough receptacles having a cross section larger than the corresponding dimensions of said insulating structures, whereby said insulating structures may move with respect to said wireway during the installation of said conductors.

4. In a panel assembly for detachably receiving detachable electrical meters having contact terminals projecting therefrom; a plurality of trough receptacles arranged in alignment for providing a continuous wireway; each of a plurality of said receptacles containing a bracket, a first insulating structure mounted on said bracket, contact means carried by said first insulating structure for detachably engaging the contact terminals of a detachable electrical meter, and a second insulating structure, said bracket and said second insulating structure having interfitting male and female portions sufficing for positioning said insulating structure relative to said bracket; a plurality of electrical conductors extending through the wireway formed by said receptacles, said second insulating structure having openings through which said electrical conductors pass for maintaining a predetermined spacing of said electrical conductors; and connecting means for connecting said conductors to said contact means.

5. In a panel assembly for detachably receiving electrical meters having contact terminals projecting therefrom; a plurality of trough receptacles arranged in alignment to provide a continuous wireway; each of a plurality of said trough receptacles containing a bracket, said bracket having a first opening extending therethrough, a first insulating structure mounted on said bracket, contact means carried by said bracket for detachably engaging the contact terminals of a detachable electrical meter, and a second insulating structure positioned in, and substantially filling, the opening extending through said bracket, whereby said bracket serves to position said second insulating structure, said second insulating structure having second openings extending therethrough in a direction substantially transverse to the direction of said first opening; a plurality of electrical conductors extending through the wireway formed by said receptacles, said conductors passing through said second openings, whereby each of said second insulating structures serve to position said conductors; and electroconductive means connecting said conductors to said contact means.

ARTHUR A. YOUNG.